United States Patent [19]

Wang et al.

[11] Patent Number: 5,130,285
[45] Date of Patent: Jul. 14, 1992

[54] PREPARATION OF CATALYST FOR USE IN FUEL OIL HYDRODESULFURIZATION AND HYDRODENITROGENATION AND CATALYST MADE BY THE PREPARATION

[75] Inventors: Ikai Wang, Hsinchu; Jung-Chung Wu, Chia-Yi, both of Taiwan

[73] Assignee: Chinese Petroleum Corp., Taipei, Taiwan

[21] Appl. No.: 638,754

[22] Filed: Jan. 8, 1991

Related U.S. Application Data

[62] Division of Ser. No. 483,117, Feb. 22, 1990, Pat. No. 5,032,253.

[51] Int. Cl.$^5$ ..................... B01J 21/06; B01J 23/84; B01J 23/88
[52] U.S. Cl. ................................... 502/309
[58] Field of Search .......................... 502/309

[56] References Cited

U.S. PATENT DOCUMENTS

| 4,128,505 | 12/1978 | Mikovsky et al. | 502/309 X |
| 4,851,381 | 7/1989 | Hums | 502/309 X |
| 5,021,385 | 6/1991 | Daly et al. | 502/309 X |

*Primary Examiner*—W. J. Shine
*Attorney, Agent, or Firm*—Thomas R. Morrison

[57] ABSTRACT

The present invention is related to a process of fuel oil hydrodesulfurization and hydrodenitrogenation, wherein cobalt-molybdenum catalysts are utilized, which are supported on a carrier of titanium-zirconium-molybdenum mixed oxides.

13 Claims, 1 Drawing Sheet

PREPARATION OF CATALYST FOR USE IN FUEL OIL HYDRODESULFURIZATION AND HYDRODENITROGENATION AND CATALYST MADE BY THE PREPARATION

This is a division of application Ser. No. 07/483,117, filed Feb. 22, 1990 now U.S. Pat. No. 5,032,253.

DETAILED DESCRIPTION OF THE INVENTION

Hydrodesulfurization (HDS) and Hydrodenitrogenation (HDN) are important processes in the petroleum refining industry. Desulfurization and denitrogenation of naphtha are carried out to prevent the platinum catalyst, which is used in a reformer, being poisoned and losing its activation coposity. The purpose of desulfurization of mid-distillate (such as heating oil) is to avoid the corrosion of equipment and improve the product quality. As to a lube oil, the desulfurization can remove the odor and stabilize the color. The purpose of residue oil desulfurization is to reduce air pollution. The sulfur and nitrogen compounds in the crude oil are distributed in different distillates at various ratios after topping process. The heavier the distillates, the more the sulfur and nitrogen compounds, and the larger the molecules will be. Therefore, different catalysts are required for these complicated reaction conditions.

It has been longer than 50 to 60 years, that transition metal sulfides have been employed as HDS and HDN catalysts. Currently, it is still the most effective one in this respect. The most common catalyst is the sulfide form of Mo and W from Group VIA, and promoted by Co and Ni from Group VIII. These active ingredients are normally supported on a carrier. The most common used carrier is $\gamma$-alumina. The carrier provides not only high surface area to increase the number of active centers of the catalyst, but also influences the reactivities and selectivities of the catalyst through its structure and acidity. CoMo and NiMo has its own optimal composition, that is the highest activitiy can only be obtained under proper ratio of Co/Mo or Ni/Mo. The $\gamma$-aluminum supported catalyst usually contains 8 to 15% of $MoO_3$, and the atomic ratio of Co/Mo or Ni/Mo is ranged from 0.3 to 0.6. Different carriers have different optimal compositions. The carrier has little influence on the optimal ratio of Co/Mo or Ni/Mo; however, as the acidity of the carrier increases, the ratio of metal components of the catalyst will have less effect on the HDS and HDN. That is, as the acidity of carrier increases, the role of metal oxide in the reaction becomes less significant. Additionally, the $\gamma$-alumina reacts with active components during the preparation of the catalyst. For example, the sodium ion in the $\gamma$-alumina will occupy the vacant position in $Al^{3+}$ and block the cobalt ion from entering the position which will result in difficulty of reduction. The $MoO_3$ reacts with $\gamma$-alumina and forms a monolayer structure. If more $MoO_3$ is present, some $Al_2(MoO_4)_3$ will be formed. It indicates the reactions between $MoO_3$ and carrier not only form monolayer structure, but also cause the migration of $Al^{3+}$ into the monolayer structure and the migration of $Mo^{6+}$ into the interior of the carrier. In the case of a small amount of cobalt and nickel, the species stay as a monolayer. As the loadings increase, cobalt and nickel ion might migrate into the interior of the carrier. Compared with cobalt ion, the nickel ion moves faster and occupies a octahedral, and the cobalt ion takes a tetrahedral position. In the HDS catalyst, cobalt and nickel does have structural reaction with molybdenum. This reaction is related to the structure of carriers and the process of calcination. There are several speculations of the mechanism of active structure during desulfurization; however, the most acceptable one is a Co-Mo-S model. How to obtain the most Co-Mo-S structure is the key to improve this type of catalysts. It relates to the preparation conditions, calcination temperatures, the contents of active components, Co/Mo ratio and the properties of carriers.

In hydrodenitrogenation, such as quinoline denitrogenation, the hydrogenolysis of C-N bond is believed to be the rate of determining step. Therefore, a bifunctional catalyst is necessary for this reaction to proceed. The acid function is useful to react with basic nitrogen atom, and the adjacent transition metal reacts with $\alpha$-carbon in the nitrogen ring. Thus, the strength of the C-N bond is reduced and the reactivity increases. Consequently, the reaction takes place at lower temperature which will ease the coking during the reaction. In indole denitrogenation, the saturation of nitrogen-containing five membered ring is the rate controlling step. Therefore, it is necessary to enhance the capability of hydrogenation. The acidity of the carrier helps the hydrogenation to proceed. In hydrodesulfurization, such as hydrodesulfurization of benzothiophene or dibenzothiophene, the reaction mechanism accepted by most people is the multi-point reactoon model wherein the benzene ring is first adsorbed on the carrier to form a $\pi$-complex, and then undergoes hydrogenation and desulfurization. Therefore, the reactivity is also related to the acidity of carriers. However, if the acidity of carriers is too high, for instance zeolite is used as carriers, the cracking reaction will occur. The cracking reaction will reduce the activity of catalysts due to coking. To find a proper carrier is an important subject to improve the performance of catalysts. To meet the above mentioned requirements, the present invention selects Ti-Zr-V mixed oxides as the carrier. The Ti-Zr-V mixed oxides have high surface area, suitable acidity and high reactivity in hydrogenation, which makes such oxides potential carriers for HDS and HDN catalysts.

Figure 1:
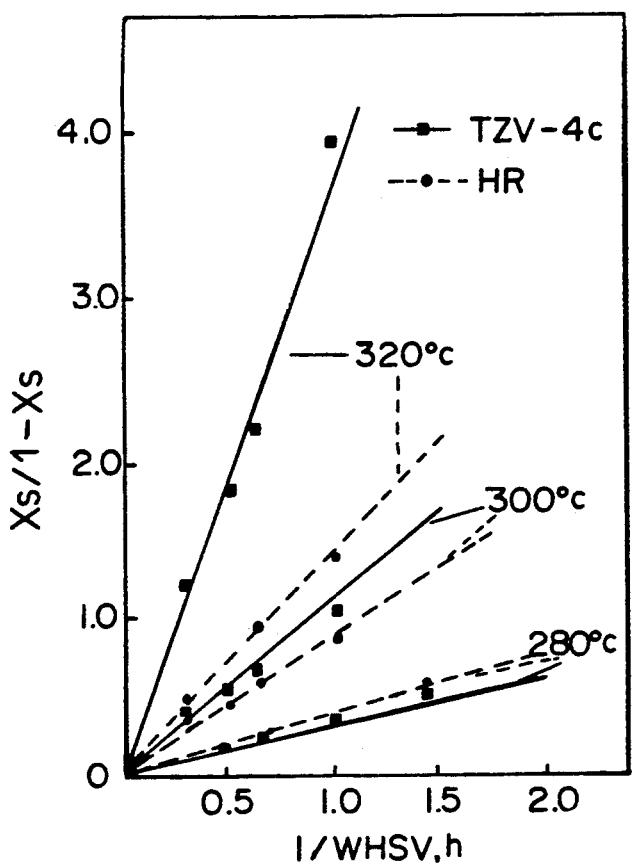
FIG. 1 shows the reactivity of HDS in heavy diesel feedstock runs using the TZV-4C catalyst of this invention and the commercial HR catalyst at various temperatures.

In the present invenion, instead of conventional $\gamma$-alumina, a titanium-zirconium-vanadium mixed oxide is chosen as a carrier to prepare the cobalt-molybdenum catalyst for the HDS of heavy diesel and vacuum gas oil. The stepwise procedures of preparing the inventive Co-Mo/Ti-Zr-V catalyst are described in the following.

step 1. Preparing the anhydrous alcohol solutions of titanium, zirconium and vanadium, wherein the titanium, zirconium and vanadium compounds can be chloride compounds or other compounds;

step 2. Mixing the alcohol solutions in different ratios, after well mixing, adding aqueous ammonia dropwisely into the mixture while stirring, in which a white coprecipitate will be obtained;

step 3. Aging the mixture containing the white coprecipitate overnight, and then centrifuging the mixture, washing the resulting cake with de-ionized water and drying the washed cake at 110° C.;

step 4. Calcining the dried cake from the above step 3 at 550° C. for 2 hours to obtain a Ti-Zr-V carrier;

step 5. Preparing an ammonium heptamolybdate solution and a cobalt nitrate solution;

step 6. Adding the ammonium heptamolybdate solution gradually into the Ti-Zr-V carrier by incipient wetness method, in which if a required amount of molybdenum can not be added at one time, add the total amount sequentially;

step 7. Putting the sample from step 6 in a light-shaded place until it is dry, and then drying the sample at 100° C. for 6 hours, heating the sample from room temperature to 400° C. at a rate of 1° C./min and maintaining the temperature at 400° C. for 6 hours, and then raising the temperature up to 500° C. at a rate of 10° C./min and maintaining the temperature at 500° C. for 2 hours; and step 8. Using incipient wetness method as described in step 6 and procedures described in step 7 to load the cobalt onto the carrier to obtain a CoMo/Ti-Zr-V catalyst.

In addition, for the purpose of comparison, the γ-alumina is used as carrier. Co and Mo are loaded onto γ-alumina according to steps 5–8 to obtain CoMo/γ-Al$_2$O$_3$ catalyst.

The catalyst prepared by the above mentioned steps is first pre-sulfided with 6% CS$_2$ toluene solution; the conditions are: LHSV, 1.25; hydrogen/toluene mole ratio of 6; pressure, 430 psig; temperature, increased from 50° C. to 250° C. at the rate of 50° C./hr and maintained for 16 hrs, and brought up to 350° C. at 50° C./hr, and staying at that temperature for 24 hrs.

The presulfided catalysts were then studied in a continuous fixed bed reactor to determine the catalytic activities under the following reaction conditions: temperature, 230°–250° C.; pressure, 500 psig; WHSV, 0.5–8.0 W/W/hr. The feeds used in these tests are synthetic feed, heavy diesel and vacuum gas oil. The composition of the synthetic feed is listed in Table 1.

TABLE 1

| Compounds | Compositions of Synthetic Feed Composition (wt %) | |
|---|---|---|
| | A | B |
| Dibenzothiophene | 1.0 | 1.0 |
| Aniline | 1.0 | — |
| Cumene | 1.0 | 1.0 |
| Mesitylene | 50.0 | 50.0 |
| Toluene | 46.5 | 47.6 |
| CS$_2$ | 0.4 | 0.4 |
| Pyridine | 0.1 | — |
| Sulfur (wt %) | 0.51 | 0.51 |

TABLE 1-continued

| Compounds | Compositions of Synthetic Feed Composition (wt %) | |
|---|---|---|
| | A | B |
| Nitrogen (wt %) | 0.17 | — |

Physical properties of heavy diesel and vacuum gas oil are: Sp. Gr.: 0.846, S: 1.14 wt %; b.p. (5/95): 160°–370° C., and Sp. Gr.: 0.982, S: 2.15 wt %; N: 525 ppm; b.p. (5/95): 320°–510° C. respectively.

The results of experiments indicate that the kinetic model of desulfinization and denitrogenation of dibenzothiophene and aniline is a pseudo-first-order reaction, i.e. $-\gamma_i = kP_{H2}{}^n = k'P_i$, when the concentrations of sulfur and nitrogen compounds are low. The i in the equation represents the type of compounds, such as dibenzothiophene and aniline. The above equation is simplified because the hydrogen is much excess relative to dibenzothiophene and aniline.

After integrating the above equation, it becomes $$-\ln(1-x_i) = k_i/WHSV \qquad (1)$$

where $x_i$ is conversion; $k_i$ is apparent reaction rate constant; WHSV is mass space velocity.

For the desulfurization of heavy diesel and vacuum gas oil, a pseudo-second-order reaction is observed. The working equation is $$x_s/1-x_s = k_{2nd}/WHSV \qquad (2)$$

where $x_s$ is sulfur conversion; $k_{2nd}$ is apparent 2nd order reaction rate constant. Using these data, catalysts reactivities are compared. For example: at the same WHSV value, the larger the $x_s/1-x_s$ ratio is, the higher sulfur conversion is and the higher catalyst reactivity is. In addition, the k value is also compared for different catalysts at the same temperature.

EXAMPLE 1

The effect of vanadium content in Ti-Zr-V carrier on reactivities of HDS and HDN Catalysts with fixed amount of MoO$_3$(4%) and CoO(2) are prepared. The composition of Ti-Zr-V carrier is represented as TiO$_2$/ZrO$_2$/V$_2$O$_5$ = 1/1/x, where x values are 0.025, 0.05, 0.075, 0.10, 0.15 and 0.20. The physical properties of the catalyst are list in Table 2.

TABLE 2

Physical Properties of various compositions of CoMo/Ti—Zr—V Catalysts

| | x | | | | | | |
|---|---|---|---|---|---|---|---|
| | 0 | 0.025 | 0.05 | 0.075 | 0.10 | 0.15 | 0.20 |
| Surface area, m$^2$/g | 208 | 175 | 118 | 104 | 88 | 72 | 53 |
| Pore volume, c.c./g | 0.34 | 0.34 | 0.31 | 0.31 | 0.32 | 0.32 | 0.33 |
| Mean pore diameter, Å | 65 | 78 | 105 | 120 | 150 | 180 | 250 |

Note:
1. x represents mole ratio of V$_2$O$_5$ in Ti—Zr—V carrier
2. Physical properties were measured after 550° C. precalcined.

The above prepared catalysts were utilized in the HDS and HDN of synthetic feed A and B, and the reactivities were determined at the reaction conditions of 350° C., 500 psig and WHSV=2. The experimental data were used to calculate the reaction rate constants for different catalysts using equation (1), and the results are listed in Table 3. The data shown in Table 3 indicate that the reactivity of HDS increases as the V$_2$O$_5$ content increases, and reaches a maximum point at 0.05 mole ratio. The HDS reactivity decreases sharply as the $V_2O_2$ content increases. The HDN reactivity also shows a maximum point at 0.05 mole ratio of $V_2O_5$. Differing from HDS, the HDN reactivity decreases not so sharply when $V_2O_5$ content increases. These phenomena are related to the acidity of carrier, the capability of providing hydrogenation active site, and the change of catalyst surface area. The results indicated, as a carrier of CoMo catalyst, the appropriate mole ratio of $V_2O_5$ in Ti-Zr-V is between 1/1/0.02–1/1/0.10.

TABLE 3

The effect of $V_2O_5$ content in Ti—Zr—V carrier on the reactivities of HDS and HDN; $MoO_3$, 4%; CoO 2%; reaction temperature, 350° C.; WHSV = 2.0 $h^{-1}$

| $V_2O_5$ content, mole ratio in $TiO_2$—$ZrO_2$—$V_2O_5$ | 0 | 0.025 | 0.05 | 0.075 | 0.10 | 0.125 | 0.15 | 0.20 |
|---|---|---|---|---|---|---|---|---|
| HDS rate constant, k, $hr^{-1}$ | 4.28 | 8.21 | 11.42 | 10.53 | 6.96 | 5.53 | 5.00 | 5.00 |
| HDN rate constant k, $hr^{-1}$ | 5.54 | 8.93 | 12.68 | 11.42 | 10.53 | 10.00 | 9.46 | 8.57 | and 16%. Gulari and co-worker also verified that with 7.5% $MoO_3$ content the CoMo/$TiO_2$ catalyst showed the maximum activity, which might be explained by that the reduction of the surface molybdate is easier at 7.5% $MoO_3$ content. The catalyst supported by Ti-Zr-V carrier has maximum HDS and HDN reactivities when the $MoO_3$ loading is 4.0%, and the maximum reactivities are greater than those of using $\gamma$-alumina as the carrier. With this result, the conclusion can be made that in a Ti-Zr-V supported system, a less amount of $MoO_3$ is required to obtain a higher activity than that of a $MoO_3/\gamma$-$Al_2O_3$ system.

TABLE 4

The effect of $MoO_3$ contents in a Ti—Zr—V supported catalyst on reactivities of HDS and HDN; $TiO_2/ZrO_2/V_2O_5$ = 1/1/0.05.

| $MoO_3$ content, wt % | 1.5 | 3.0 | 4.0 | 6.0 | 8.0 | 10.0 | 13.0 | 15.0 |
|---|---|---|---|---|---|---|---|---|
| HDS rate constant, k, $hr^{-1}$ | 1.36 | 3.04 | 5.80 | 4.08 | 3.52 | 2.72 | 1.76 | 0.96 |
| HDN reaction rate constant, k, $hr^{-1}$ | 1.92 | 3.20 | 4.32 | 4.00 | 3.68 | 3.36 | 3.20 | 2.76 |

TABLE 5

The effect of $MoO_3$ contents in a $\gamma$-$Al_2O_3$ supported catalyst on reactivities of HDS and HDN

| $MoO_3$ content, wt % | 2.0 | 4.0 | 6.0 | 8.0 | 10.0 | 12.0 | 14.0 | 16.0 | 20.0 |
|---|---|---|---|---|---|---|---|---|---|
| HDS rate constant, k, $hr^{-1}$ | 1.40 | 1.78 | 2.58 | 3.67 | 4.84 | 5.30 | 5.40 | 5.36 | 3.69 |
| HDN rate constant, k, $hr^{-1}$ | 1.09 | 1.29 | 1.78 | 2.58 | 3.27 | 3.67 | 3.72 | 3.70 | 2.07 |

EXAMPLE 2

The effect of molybdenum content in catalysts with different types of carrier on the reactivities of HDS and HDN The content of molybdenum, one of the active components in catalysts, has an optimum when concerning the catalytic activity. Too high a molybdenum content in catalysts will reduce the activity of catalysts. The optimal value varies for different types of carrier. For instance, the optimal $MoO_3$ content for a $\gamma$-alumina carrier is ranged from 8 to 15%, for the $TiO_2$ carrier, the optimal content is between 6 and 9%. However, the proper $MoO_3$ content in the Ti-Zr-V carrier prepared by this invention is ranged from 2.0 to 10.0%, preferably 3.0–6.0% as indicated in Table 4, wherein the composition of the carrier is $TiO_2/ZrO_2/V_2O_5$=1/1/0.05 calcined at 550° C., the feed is synthetic A feed, and the reaction is carried out at 350° C. and 500 psig. The results of using $\gamma$-alumina as the carrier are listed in Table 5. The data in Table 5 show that the catalysts with low $MoO_3$ gave low activities. This is possibly due to the difficulty of $MoO_3$ reduction. The highest activity can be observed when $MoO_3$ content is between 14

EXAMPLE 3

The effect of CoO/$MoO_3$ ratio in a CoMo/Ti-Zr-V catalyst on reactivities of HDS and HDN For the purpose of studying the effect of CoO promoter in Ti-Zr-V system, TZV-4A, TZV-4B, TZC-4C, TZV-4D and TZV-4E are prepared, and their physical properties are shown in Table 6.

TABLE 6

Physical Properties of CoMo/Ti—Zr—V Catalysts

| Catalyst | $MoO_3$ wt % | CoO wt % | S.A. $m^2/g$ | pore vol. c.c./g | mean pore dia. Å |
|---|---|---|---|---|---|
| TZV-4A | 4.0 | 0.5 | 130 | 0.30 | 88 |
| TZV-4B | 4.0 | 1.5 | 125 | 0.30 | 90 |
| TZV-4C | 4.0 | 2.0 | 118 | 0.31 | 92 |
| TZV-4D | 4.0 | 3.0 | 114 | 0.32 | 99 |
| TZV-4E | 4.0 | 4.0 | 112 | 0.32 | 104 |
| Commercial catalyst HR | 8.0 | 3.5 | 188 | 0.47 | 100 |

Generally speaking, the addition of CoO to Mo catalysts will dramatically enhance the reactivity of HDS and HDN. Table 7 indicates that the effect of CoO/MoO₃ ratio in a CoMo/Ti-Zr-V catalyst on the reactivity of HDS and HDN. At CoO/MoO₃=0.5, the highest reactivity of HDS and HDN is observed. For the case of synthetic feed A, the reactivities are enhanced two-fold for HDS and threefold for HDN with different types of carrier will result in different increasing ratios. For example: the effect is insignificant when alumina is used as the carrier; however, the reactivity increases 75% when titanium oxide is used as the carrier. Because the cobalt has high activity for hydrogenation and the aniline has to be hydrogenated before it can undergo C-N bond cleavage, the prompted effect of aniline HDN due to cobalt addition is more significant than HDS of dibenzothiophene. In a CoMo/Ti-Zr-V catalyst for HDS and HDN, the preferred CoO/MoO₃ ratio is between 0.27 and 0.75.

TABLE 7

The effect of CoO/MoO₃ ratio in a CoMo/Ti—Zr—V catalyst on the reactivities of HDS and HDN

| CoO/MoO₃ ratio | 0 | 0.125 | 0.25 | 0.375 | 0.50 | 0.75 | 1.0 |
|---|---|---|---|---|---|---|---|
| HDS relative reactivity (Promoted/Unpromoted) | 1 | 1.19 | 1.33 | 1.47 | 2.12 | 1.67 | 1.55 |
| HDN relative reactivity (Promoted/Unpromoted) | 1 | 1.67 | 1.89 | 2.11 | 3.10 | 2.30 | 2.03 |

EXAMPLE 4

The comparison of HDS of dibenzothiophene and HDN of aniline over TZV-4C and commercial HR catalyst To compare the activity of a catalyst prepared by method of this invention with that of a commercial catalyst of HDS and HDN, TZV-4C anf commercial HR catalyst (with γ-Al₁O₃ carrier and compositions listed in Table 3) was tested to examine the HDS of dibenzothiophene and HDN of aniline under the reaction conditions of 500 psig, 240° C.-350° C. and WHSV=2.0. Using the synthetic feed A as the feeding reactant, the results are listed in Table 8 and Table 9. From Table 8, both catalysts shows similar reactivities of HDS at low reaction temperature (260° C.). The Ti-Zr-V supported catalyst has higher hydrogenated products (biphenyl). At 300° C. reaction temperature, the Ti-Zr-V supported catalyst shows higher activity than γ-Al₂O₃ supported catalyst, and the hydrogenated product also increases (this means biphenyl product decreases). The commercial HR catalyst can not provide effective hydrogenation active site, so that the increase of hydrogenated product is limited. As shown in Table 8, the Ti-Zr-V carrier has the capability of catalyzing hydrogenation; therefore, the reactivity of HDN is twice as high as of the γ-alumina system. At low reaction temperature, the hydrogenolysis of C-N bond is slow which results in the poison of HDS active sites. This explains the low reactivity of HDS. At high reaction temperature, the rate of C-N hydrogenolysis over a Ti-Zr-V system is far quicker than that over a γ-Al₂O₃ system which results in the higher HDS activity. In the mean time, TZV-4C also produces higher hydrogenated product, i.e. cyclohexane, as shown in Table 9.

TABLE 8

The comparison of HDS reactivity of dibenzothiophene and product distribution over TZV-4C and commercial HR catalyst

| Reaction temp. °C. | 240 | 260 | 280 | 300 | 325 | 350 |
|---|---|---|---|---|---|---|
| Conversion of dibenzothiophene, % | | | | | | |
| TZV-4C | 14 | 26 | 56 | 85 | 94 | 99 |
| HR | 16 | 27 | 48 | 71 | 87 | 95 |
| Biphenyl selectivity, % | | | | | | |
| TZV-4C | 64 | 56 | 41 | 30 | 22 | 18 |
| HR | 90 | 85 | 80 | 75 | 72 | 70 |

TABLE 9

The comparison of HDN reactivity of aniline and product distribution over TZV-4C and commercial HR catalyst

| Reaction temp., °C. | 240 | 260 | 280 | 300 | 325 | 350 |
|---|---|---|---|---|---|---|
| Conversion of aniline, % | | | | | | |
| TZV-4C | 17 | 29 | 60 | 85 | 92 | 98 |
| HR | 10 | 15 | 25 | 38 | 57 | 78 |
| Cyclohexane selectivity, % | | | | | | |
| TZV-4C | 55 | 57 | 73 | 82 | 85 | 86 |
| HR | 52 | 53 | 54 | 60 | 68 | 75 |

EXAMPLE 5

The comparison of simultaneous HDS and HDN over various carriers

The literature indicates that the nitrogen compound (such as aniline) will inhibit the HDS of dibenzothiophene, when the feed contains both sulfur and nitrogen compounds. The extent of the inhibition is different for different types of catalyst and carrier. To understand the difference between Ti-Zr-V carrier from this invention and conventional alumina carrier, TZV-4C and A-2 catalysts are chosen to test the reactivity of HDS by feeding both synthetic feed A and synthetic feed B to reactor. Table 10 lists results.

TABLE 10

The effects of nitrogen compound in the feed stream on the HDS reactivity

| | | Catalyst | | | |
|---|---|---|---|---|---|
| | | TZV-4C | | A-2 | |
| | | Synthetic feed | | | |
| | | A | B | A | B |
| HDS rate constant of Dibenzothiophene, k, hr⁻¹ | 240° C. | 0.32 | 0.40 | 0.34 | 0.39 |
| | 260° C. | 0.59 | 0.74 | 0.58 | 0.79 |
| | 280° C. | 1.62 | 1.94 | 1.30 | 2.25 |
| | 300° C. | 3.07 | 3.60 | 1.87 | 3.17 |
| | 325° C. | 4.94 | 6.54 | 2.85 | 5.18 |
| | 350° C. | 11.82 | 12.80 | 4.20 | 9.68 |

Note:
1. A-2 is CoMo/γ-Alumina catalyst, where in the MoO₃ is 4% and CoO is 2%.
2. The compositions of synthetic feed A and B are listed in Table 1.

Table 10 discloses that HDS reactivity of feed B is slightly higher than feed A, which indicates the nitrogen compound has insignificant poison effect on a Ti-Zr-V carrier. Especially at 350° C. reaction temperature, the reactivities of both feeds are close. However, in the A-2 catalyst case (using alumina as carrier), it shows a significant difference for feed A and B. At the reaction temperature higher than 280° C., the difference between feed A and B is by one fold. The results indicate that the nitrogen compound has significant effect on alumina carrier. Normally, oil such as heavy diesel and vacuum gas oil always contains nitrogen compounds, so that using the Ti-Zr-V carrier of the present invention certainly will have greater HDS activity.

EXAMPLE 6

The comparison of HDS reactivity over TZV-4C and commercial HR catalyst

Figure 2:
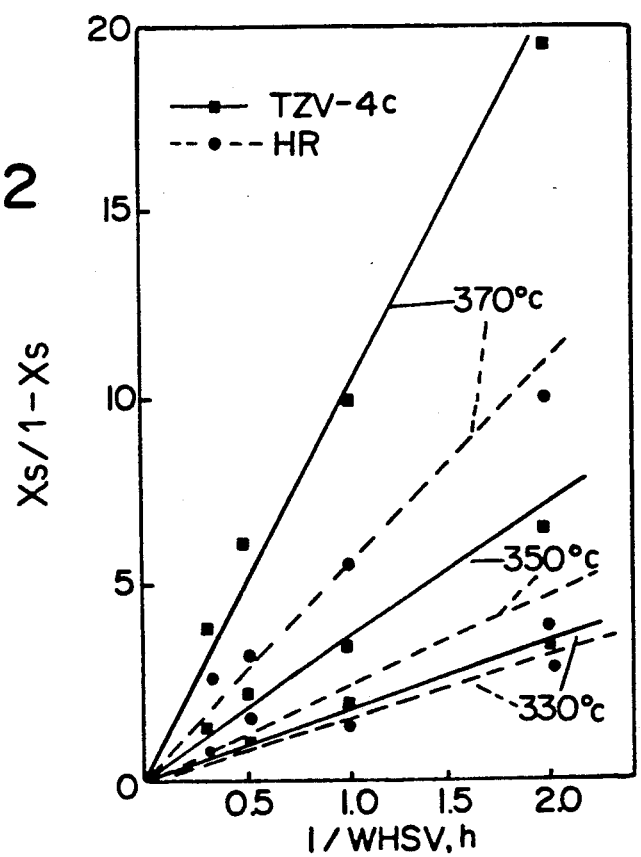
FIG. 2 shows the reactivity of HDS in vacuum gas oil feedstock runs using the TZV-4C catalyst of this invention and the commercial HR catalyst at various temperatures.

To examine CoMo/Ti-Zr-V in actual practice, a heavy diesel and a vacuum gas oil were chosen as feedstocks to test the HDS reactivities over TZV-4C catalyst and commercial HR catalyst. Results are given in FIGS. 1 and 2, where the $x_s/1-x_s$ ratio indicates the reactivity of HDS. In heavy diesel feedstock runs, the TZV-4C and the commercial HR catalyst had similar reactivities at the reaction temperature of 280° C. However, at operating temperature higher than 280° C., the TZV-4C is more active. The reactivity difference between both catalysts increases as temperature increases. FIG. 2 also shows the same trend for the runs of using vacuum gas oil as feedstock.

From the abovementioned examples, it is shown that the CoMo catalyst supported by the Ti-Zr-V mixed is more active than conventional CoMo/$\gamma$-Al$_2$O$_3$ catalysts in the application of HDS and HDN. The optimal amount of MoO$_3$ is 4%, which is far less than the 8–15% loading of conventional catalysts. Especially, because the Ti-Zr-V supported catalyst can tolerate the nitrogen compounds, which are always found in the petroleum fraction, it enhances the efficacy of using the catalyst system of the invention.

We claim:

1. A process for preparing a catalyst for use in desulfurization and denitrogenation of a petroleum fraction, which process comprises mixing together predetermiend amounts of anhydrous solutions of titanium, zirconium and vanadium compounds to form a mixture, then adding aqueous ammonia to said mixture accompanied with stirring of the mixture until a white coprecipitate is obtained, ageing the coprecipitated mixture for a predetermined amount of time and washing said mixture with deionized water to recover the coprecipitate followed by drying the recovered coprecipitate, calcining the dried recovered precipitate at a temperature of about 550 degrees C. for a time of about 2 hours thereby to obtain a titanium-zirconium-vanadium oxides carrier, wetting the carrier with a molybdenum solution so that molybdenum from the solution thereof is absorbed by the carrier, storing the thus treated carrier at a light-shaded location until it is dry, and then further drying the treated carrier by heating it at about 100 degrees C. for about 6 hours, calcining the treated and further dried carrier in an operation that involves a first heating from a room temperature to about 400 degrees at a rate of about 1 degree C./min. and then maintaining the temperature at 400 degrees C. for about 6 hours, and a second heating at the end of the first in which the temperature is raised to about 500 degrees C. at a rate of about 10 degrees C./min. and then maintaining the temperature at 500 degrees C. for about 2 hours, wetting the thus calcined carrier with a cobalt solution so that cobalt from the solution thereof is absorbed by the calcined carrier, storing the cobalt treated carrier at a light-shaded location until it is dry, and then further drying the cobalt treated carrier by heating it at about 100 degrees C. for about 6 hours, and calcining the further dried cobalt treated carrier in an operation that involves a first heating from a room temperature to about 400 degrees C. at a rate of about 1 degree C./min. and then maintaining the temperature at 400 degrees for about 6 hours, and a second heating at the end of the first in which the temperature is raised to about 500 degrees C. at a rate of about 10 degrees C./min. and then maintaining the temperature at 500 degrees C. for about 2 hours to thus obtain a cobalt-molybdenum/titanium-zirconium-vanadium catalyst.

2. The process of claim 1 in which the compounds are chlorides.

3. The process of claim 1 in which the coprecipitate is dried at a temperature of about 110 degrees C.

4. The process of claim 1 in which molybdenum solution is a solution of ammonium heptamolybdate.

5. The process of claim 1 in which the titanium-zirconium-vanadium compounds are mixed in such amounts as to provide a carrier in which the mole ratio of TiO$_2$/ZrO$_2$/V$_2$O$_5$ is 1/1/0.02–0.1.

6. The process of claim 5 in which the titanium-zirconium-vanadium compounds are mixed in amounts to give a TiO$_2$/ZrO$_2$/V$_2$O$_5$ mole ratio of 1/1/0.05.

7. The process of claim 1 in which the molybdenum solution is applied to the carrier sufficient to provide a catalyst presence of molybdenum of about 2% to about 10% by weight.

8. The process of claim 7 in which the molybdenum presence is about 3%–6%.

9. The process of claim 8 in which the molybdenum presence is about 4.0%.

10. A process for preparing a catalyst for use in desulfurization and denitrogenation of a petroleum fraction which comprises subjecting the catalyst made by the process of claim 1 prior to its desulfurization and denitrogenation use to pre-sulfiding with a 6% CS$_2$ toluene solution and under conditions of LHSV of 1.25, hydrogen/toluene mole ratio of about 6.0, a temperature initiated at about 50 degrees C. and raised to about 250 degrees C. at the rate of 50 degrees C./hr whereat it is then maintained for about 16 hours, the temperature thereafter being raised to about 350 degrees C. at a rate of 50 degrees C./hr whereat it is then maintained for about 24 hours.

11. A petroleum fraction desulfurization and denitrogenation catalyst mmade by the process of claim 1.

12. A petroleum fraction desulfurization and denitrogenation catalyst made by the process of claim 5.

13. A petroleum fraction desulfurization and denitrogenation catalyst made by the process of claim 10.

* * * * *